(12) United States Patent
Fukushima

(10) Patent No.: US 12,370,840 B2
(45) Date of Patent: Jul. 29, 2025

(54) TWO-WHEEL VEHICLE TIRE

(71) Applicant: Sumitomo Rubber Industries, Ltd., Kobe (JP)

(72) Inventor: Kazuki Fukushima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/379,399

(22) Filed: Oct. 12, 2023

(65) Prior Publication Data
US 2024/0140142 A1   May 2, 2024

(30) Foreign Application Priority Data

Nov. 1, 2022   (JP) ................................. 2022-175718
Nov. 1, 2022   (JP) ................................. 2022-175719

(51) Int. Cl.
| | |
|---|---|
| *B60C 11/03* | (2006.01) |
| *B60C 11/117* | (2006.01) |
| *B60C 11/13* | (2006.01) |

(52) U.S. Cl.
CPC ...... *B60C 11/1392* (2013.01); *B60C 11/0302* (2013.01); *B60C 11/032* (2013.01); *B60C 2200/10* (2013.01)

(58) Field of Classification Search
CPC . B60C 11/13; B60C 11/1307; B60C 11/1315; B60C 11/1323; B60C 2011/133
See application file for complete search history.

(56) References Cited

U.S. PATENT DOCUMENTS

| | | | | | |
|---|---|---|---|---|---|
| D522,446 | S | * | 6/2006 | Shibamoto | D12/535 |
| D565,500 | S | * | 4/2008 | Whitney | D12/535 |
| D717,724 | S | * | 11/2014 | Fontaine | D12/535 |
| D778,225 | S | * | 2/2017 | Mariani | D12/535 |
| D1,004,530 | S | * | 11/2023 | Mariani | D12/535 |
| D1,028,859 | S | * | 5/2024 | Kobori | D12/535 |
| D1,037,131 | S | * | 7/2024 | Kobori | D12/535 |
| 2014/0034201 | A1 | * | 2/2014 | Kajimoto | B60C 9/2204 |
| | | | | | 152/209.18 |

(Continued)

FOREIGN PATENT DOCUMENTS

| | | | | |
|---|---|---|---|---|
| EP | 0 855 291 B1 | | 9/2003 | |
| GB | 1549347 A | * | 8/1979 | ......... B60C 11/0309 |

(Continued)

OTHER PUBLICATIONS

Machine Translation: JP-08188016-A, Tamura H, (Year: 2024).*

(Continued)

*Primary Examiner* — Kendra Ly
(74) *Attorney, Agent, or Firm* — Birch, Stewart, Kolasch & Birch, LLP

(57) ABSTRACT

A two-wheel vehicle tire has a tread portion. The tread portion includes a plurality of grooves. The grooves include crown grooves arranged on a tire equator, middle grooves, and shoulder grooves. Each of the crown grooves is bent in a V-shape so as to be convex to one side in a tire circumferential direction. Each of the grooves has the shortest distance from 5% to 30% of a tread development half width between another one of the grooves immediately adjacent to the each of the grooves.

20 Claims, 7 Drawing Sheets

(56) References Cited

U.S. PATENT DOCUMENTS

| | | | |
|---|---|---|---|
| 2014/0116591 A1* | 5/2014 | Kurashina | B60C 11/0302 |
| | | | 152/209.28 |
| 2014/0230978 A1* | 8/2014 | Misani | B60C 11/033 |
| | | | 152/209.8 |
| 2019/0168543 A1* | 6/2019 | Kobori | B60C 11/1353 |
| 2019/0193470 A1 | 6/2019 | Fukushima et al. | |
| 2020/0079155 A1 | 3/2020 | Muramatsu | |
| 2020/0238765 A1 | 7/2020 | Nakamura et al. | |

FOREIGN PATENT DOCUMENTS

| | | | | | |
|---|---|---|---|---|---|
| JP | 02179508 A | * | 7/1990 | | B60C 11/0309 |
| JP | 08188016 A | * | 7/1996 | | |
| JP | 2019-111973 A | | 7/2019 | | |

OTHER PUBLICATIONS

Machine Translation: JP-02179508-A, Morikawa Y, (Year: 2024).*
European Search Report for European Application No. 23203026.2, dated May 7, 2024.

* cited by examiner

TWO-WHEEL VEHICLE TIRE

RELATED APPLICATIONS

This application claims the benefit of foreign priority to Japanese Patent Applications No. JP2022-175718 and JP2022-175719, filed Nov. 1, 2022, which are incorporated by reference in their entirety.

FIELD OF THE INVENTION

The present disclosure relates to a two-wheel vehicle tire.

BACKGROUND OF THE INVENTION

Japanese Unexamined Patent Application Publication No. 2019-111973 proposes a motorcycle tire having a tread portion provided with a first oblique main groove and a second oblique main groove inclined to a side opposite to each other. The tread portion includes a first tread edge and a first region demarcated by the first tread edge, the first oblique main groove, and the second oblique main groove. The first region has a plurality of blocks. Each of the blocks has peaks each having an angle of 45 degrees or more.

SUMMARY OF THE INVENTION

In recent years, various types of motorcycles have been introduced that are mainly used for on-road driving, but can also be used for off-road driving to some extent. Tires used for such motorcycles are required to have off-road straight running stability so that the motorcycles can pass through without tipping during off-road running, for example. Further, the above-mentioned tires are also required to have uneven wear resistance performance, as they are designed for both on-road and off-road use.

The present disclosure was made in view of the above, and a primary object thereof is to provide a two-wheel vehicle tire having improved on-road handling performance and improved uneven wear resistance performance while maintaining the off-road straight running stability.

The present disclosure is a two-wheel vehicle tire having a tread portion,
  wherein the tread portion includes a first tread edge, a second tread edge, a ground contact surface demarcated between the first tread edge and the second tread edge, a plurality of grooves arranged on the ground contact surface, and a tread development half width,
  wherein the tread development half width is a distance along the ground contact surface from a tire equator to the first tread edge,
  the grooves include a plurality of crown grooves arranged on the tire equator, a plurality of middle grooves arranged on the first tread edge side of the crown grooves, and a plurality of shoulder grooves arranged on the first tread edge side of the middle grooves,
  each of the crown grooves is bent in a V-shape so as to be convex to one side in a tire circumferential direction, and
  each of the grooves has the shortest distance from 5% to 30% of the tread development half width between another one of the grooves immediately adjacent to the each of the grooves.

By adopting the above configuration, the two-wheel vehicle tire of the present disclosure can improve the on-road handling performance and the uneven wear resistance performance while maintaining the off-road straight running stability.

DETAILED DESCRIPTION OF THE INVENTION

Figure 1:
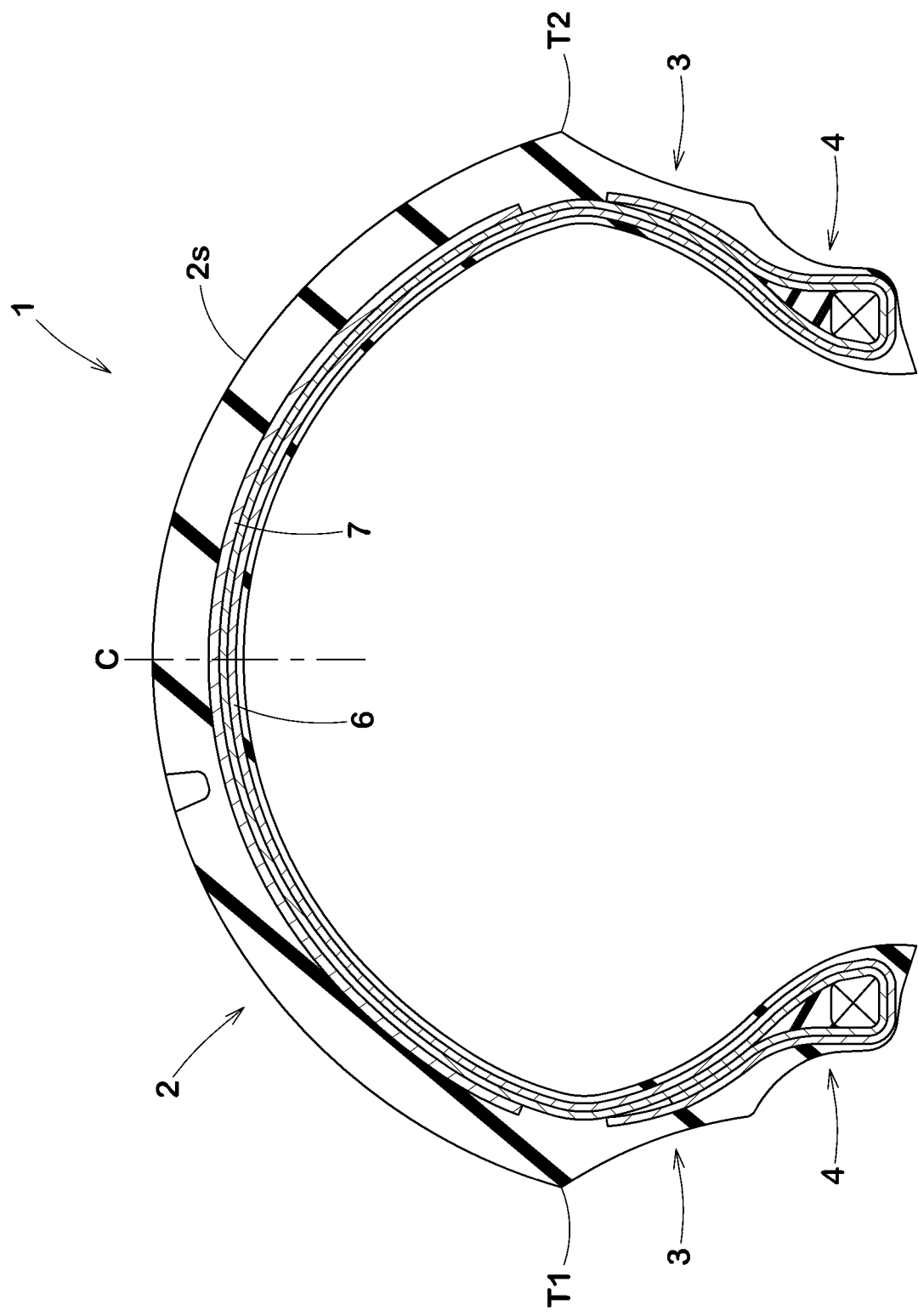
FIG. 1 is a cross-sectional view of a two-wheel vehicle tire according to an embodiment of the present disclosure.
Figure 2:
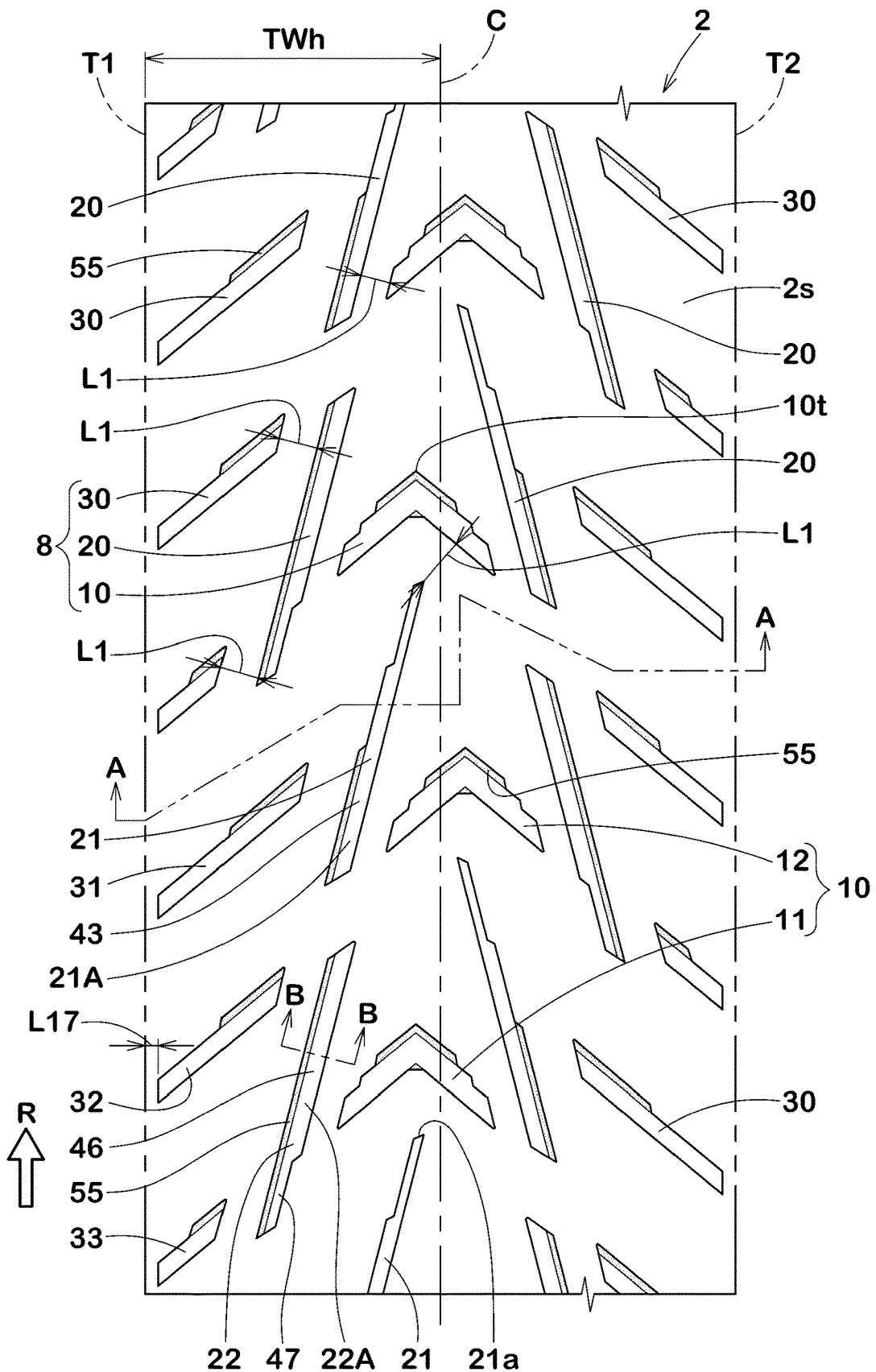
FIG. 2 is a development view of a tread portion of FIG. 1.

An embodiment of the present disclosure will now be described in conjunction with accompanying drawings.
FIG. 1 is a tire meridian section of a two-wheel vehicle tire 1 of the present embodiment (hereinafter may be simply referred to as "tire") in a standard state. FIG. 2 is a development view showing a tread pattern of a tread portion 2 of the tire 1. FIG. 1 corresponds to a cross-sectional view taken along A-A line in FIG. 2. As shown in FIGS. 1 and 2, the tire 1 of the present embodiment is a tire intended for a motorcycle that is mainly used for on-road driving and can also be used for off-road driving to some extent (hereinafter may sometimes be referred to as a "dual-purpose vehicle") and the tire 1 is for use on a rear wheel. However, the tire 1 of the present disclosure is not limited to such a manner and may be used for bicycles. Further, a distance between the first tread edge T1 and the second tread edge T2 in a tire axial direction is a maximum width of the tire 1.

The term "standard state" refers to a state in which the tire 1 is mounted on a standard rim (not shown), inflated to a standard inner pressure, and loaded with no tire load. In the case of tires for which various standards are not established, the standard state means a state of standard usage according to the purpose of use of the tire and a state in which the tire is loaded with no tire load. In the present specification, unless otherwise noted, dimensions and the like of various parts of the tire are the values measured in the standard state. In particular, the dimensions of each groove are measured in a tread development view in which the ground contact surface of the tread portion 2 of the tire 1 in the standard state is developed into a plane.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 of the present embodiment includes the tread portion 2, a pair of sidewall portions 3, and a pair of bead portions 4. The sidewall portions 3 are continuous with the tread portion 2, one on each side in the tire axial direction. Each of the bead portions 4 is continuous with a respective one of the sidewall portions 3 on an inner side in a tire radial direction. The tread portion 2 includes a first tread edge (T1) and a second tread edge (T2) and a ground contact surface (2s) demarcated therebetween.

It is preferred that the ground contact surface (2s) of the tread portion 2 is convex outward in the tire radial direction and curved in an arc shape so that a sufficient ground contacting area can be obtained even when cornering with a large camber angle. The first tread edge (T1) and the second tread edge (T2) are the edges of the curved ground contact surface (2s), which can at least touch the ground when cornering at the maximum camber angle.

The tire 1 of the present embodiment includes a carcass 6 extending from the bead portion 4 on one side to the bead portion 4 on the other side via the sidewall portion 3 on one side, the tread portion, and the sidewall portion on the other side. Further, a tread reinforcing layer 7 is disposed radially outside the carcass 6 in the tread portion 2. For the carcass 6 and the tread reinforcing layer 7, known configurations can be employed as appropriate.

As shown in FIG. 2, the tread portion 2 has a directional pattern with a rotational direction (R) assigned, for example. The rotational direction (R) is indicated in letters or symbols in the sidewall portions 3 (shown in FIG. 1), for example. However, the present disclosure is not limited to such an aspect. It should be noted that the rotational direction (R) is indicated by an arrow in some of the figures of the present specification.

The tread portion 2 includes a plurality of grooves 8 arranged on the ground contact surface (2s). The grooves 8 include a plurality of crown grooves 10, a plurality of middle grooves 20, and a plurality of shoulder grooves 30. The crown grooves 10 are arranged on a tire equator (C). The middle grooves 20 are arranged closer to the first tread edge (T1) than the crown grooves 10 are. The shoulder grooves 30 are arranged closer to the first tread edge (T1) than the middle grooves 20 are.

Figure 3:
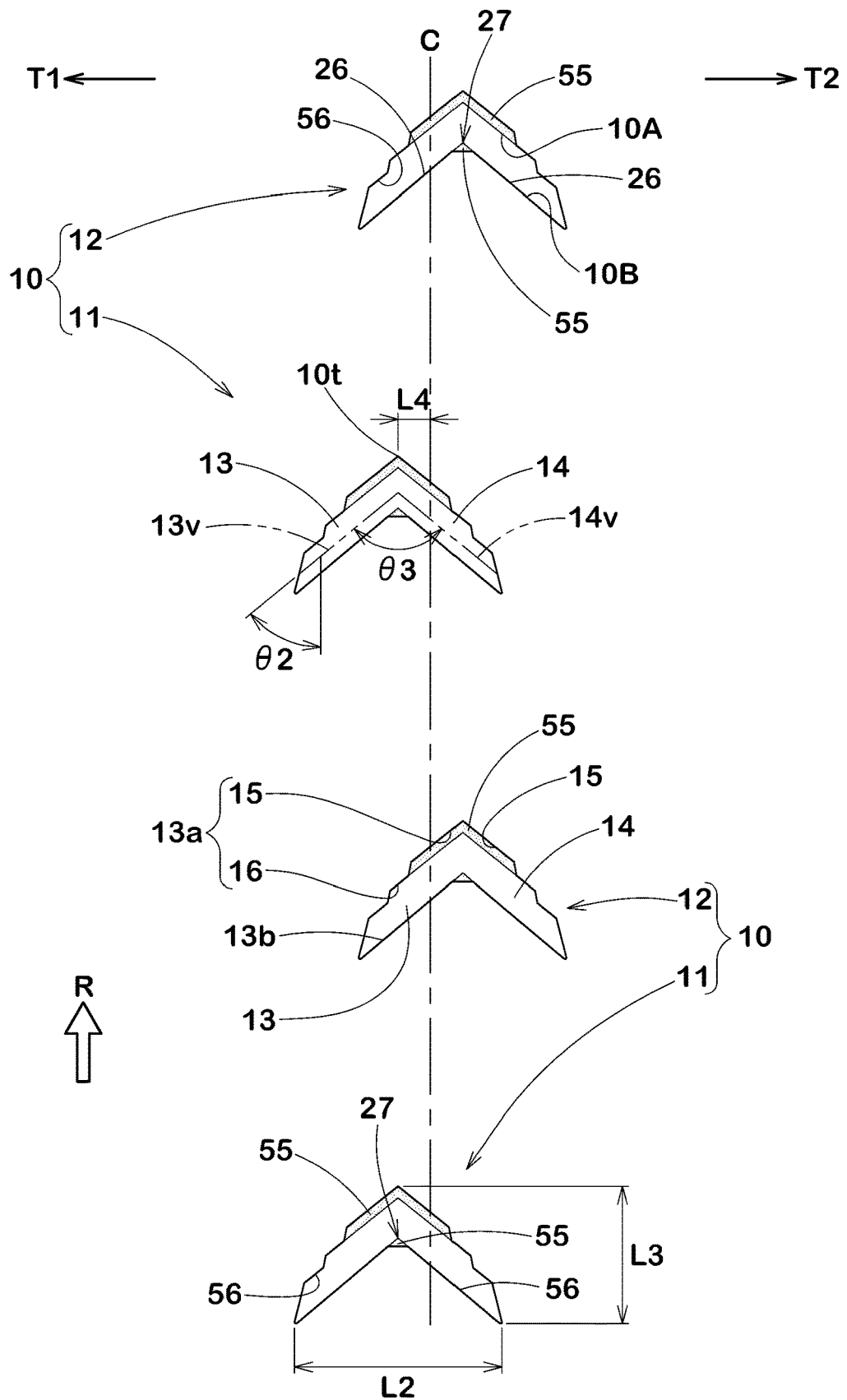
FIG. 3 is an enlarged view of crown grooves of FIG. 2.

FIG. 3 is an enlarged view of the crown grooves 10. The middle grooves 20 and the shoulder grooves 30 are omitted in FIG. 3. As shown in FIG. 3, each of the crown grooves 10 is curved (or bent) in a V-shape so as to be convex to one side in a tire circumferential direction. It should be noted that in this configuration, each of the crown grooves 10 includes a first oblique groove portion 13 and a second oblique groove portion 14 inclined to opposite sides to each other with respect to the tire axial direction, and in each of the crown grooves, each of lengths (each so-called a periphery length along the groove portion) of the first oblique groove portion 13 and the second oblique groove portion 14 is 30% or more of the overall length of the crown groove 10. As a preferred manner, each of the lengths of the first oblique groove portion 13 and the second oblique groove portion 14 is 40% or more of the overall length of the crown groove 10.

As shown in FIG. 2, in the present disclosure, each of the grooves 8 has the shortest distance (L1) between another groove 8 immediately adjacent thereto. The shortest distance (L1) is the shortest distance along the ground contact surface (2s) and is from 5% to 30% of a tread development half width (TWh). It should be noted that the tread development half width (TWh) corresponds to a distance along the ground contact surface (2s) from the tire equator (C) to the first tread edge (T1). In the present embodiment, for each of the grooves 8, each of the shortest distances (L1) between the each of the grooves 8 and other grooves 8 immediately adjacent to the each of the grooves 8 is from 5% to 30% of the tread development half width (TWh), for example. In other words, in each pair of the grooves 8 immediately adjacent to each other, the shortest distance (L1) between the grooves 8 in the pair is from 5% to 30% of the tread development half width (TWh), for example.

By adopting the above configuration, the tire 1 of the present disclosure can improve the on-road handling performance and the uneven wear resistance performance while maintaining the off-road straight running stability. The reasons for it are as follows.

The tread portion 2 of the tire 1 of the present disclosure is provided with the crown grooves 10, the middle grooves 20, and the shoulder grooves 30. While these grooves enhance off-road performance, they also help to even out the rigidity of the tread portion 2 and enhance the on-road handling performance. Further, each of the crown grooves 10 in the present disclosure is curved in a V-shape so as to be convex toward one side with respect to the tire circumferential direction, therefore, the off-road straight running stability can be improved.

Further, since the shortest distance (L1) is specified as 5% or more of the tread development half width (TWh) in the present disclosure, the grooves are not too close to each other, thereby, the on-road handling performance and the uneven wear resistance performance are improved. Furthermore, since the shortest distance (L1) is specified as 30% or less of the tread development half width (TWh) in the present disclosure, the grooves are not too far from each other, therefore, sufficient off-road performance is exerted.

A more detailed configuration of the present embodiment will be described below. It should be noted that each configuration described below represents a specific aspect of the present embodiment. Therefore, it goes without saying that the present disclosure can exhibit the above effects even if it does not have the configuration described below. Further, even if any one of the configurations described below is applied singly to the tire of the present disclosure having the features described above, an improvement in performance can be expected according to the applied configuration. Furthermore, when some of the configurations described below are applied in combination, a combined performance improvement can be expected according to each of the applied configurations.

As shown in FIG. 2, as a preferred aspect, the grooves 8 are arranged so that each of the grooves 8 has the short distance (L1), between another groove 8 immediately adjacent thereto, from 10% to 25% of the tread development half width (TWh). As a result, the off-road straight running stability and the uneven wear resistance performance are improved in a good balance.

Each of the grooves 8 is provided with a chamfered portion 55 in at least a part thereof. In the present specification, the chamfered portions 55 are shaded in the plan views of the grooves 8. In the present embodiment, at least a portion of each of the groove 8 is formed with the chamfered portion 55, therefore, it is possible that the uneven wear resistance performance is further improved.

Figure 4:
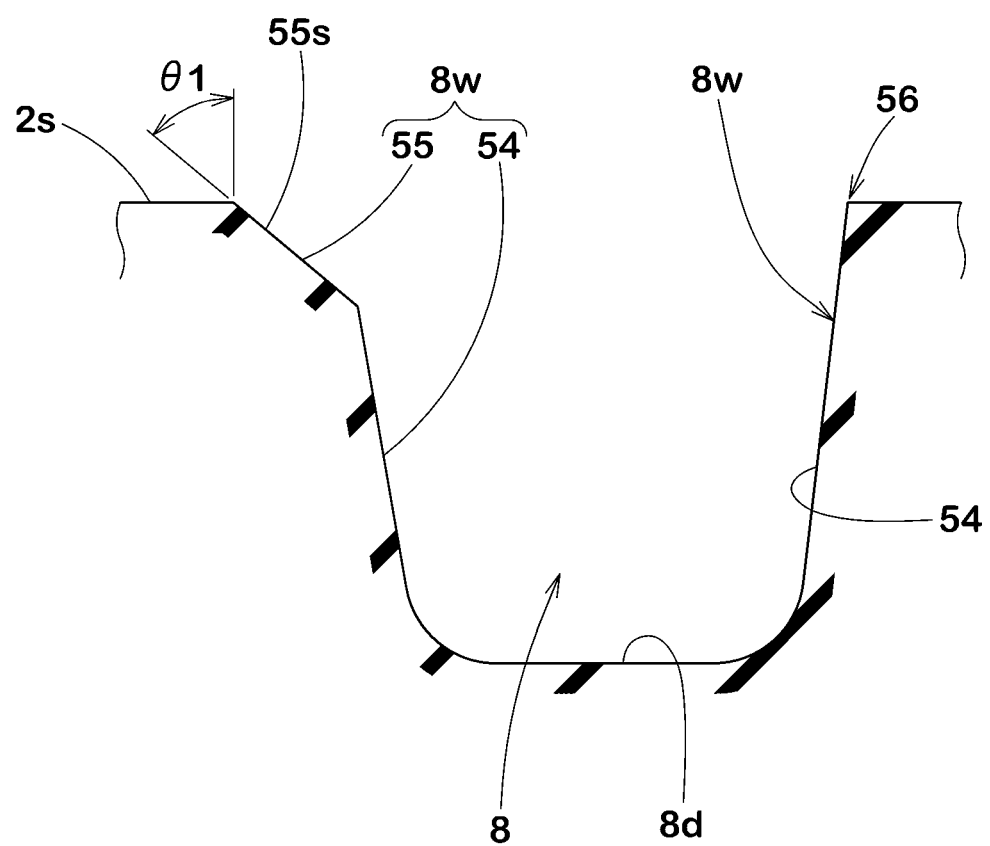
FIG. 4 is a cross section taken along B-B line.

FIG. 4 is a cross-sectional view taken along B-B line in FIG. 2 as a diagram showing an example of the chamfered portion 55. As shown in FIG. 4, each of the grooves 8 has groove walls (8w). In the region where the chamfered portion 55 is formed, the groove wall (8w) includes a groove wall main body 54 extending outward in a groove depth direction from a groove bottom surface (8d) and the chamfered portion 55 extending from the groove wall main body 54 to the ground contact surface (2s). It should be noted that outward in the groove depth direction is a direction from the groove bottom surface (8d) toward the ground contact surface (2s) and inward in the groove depth direction is a direction from the ground contact surface (2s) to the groove bottom surface (8d) in the present embodiment. In the region where the chamfered portion 55 is not formed, the groove wall (8w) is formed by the groove wall main body 54 extending from the groove bottom surface (8d) to the ground contact surface (2s). Hereinafter, the region where the chamfered portion 55 is not formed may be referred to as "non-chamfered portion 56".

The chamfered portion 55 is composed of a sloping surface (55s) connected to the ground contact surface (2s) of the tread portion 2. The sloping surface (55s) in the present embodiment is planar. In other embodiments, the sloping surface (55s) may be curved in an arc shape convex outward in the groove depth direction or curved in an arc shape concave inward in the groove depth direction. From the viewpoint of sufficiently improving the uneven wear resistance performance, the sloping surface (55s) has an angle θ1 from 40 to 60 degrees with respect to a tread normal which is a normal line of the ground contact surface (2s) at the connecting edge with the sloping surface (55s), for example.

As shown in FIG. 3, the crown grooves 10 include a plurality of first crown grooves 11 and a plurality of second crown grooves 12. The first crown grooves 11 are arranged on the tire equator (C) with the axial centers thereof displaced to the first tread edge (T1) side. The second crown grooves 12 are arranged on the tire equator (C) with the axial centers thereof displaced to the second tread edge (T2) side. The first crown grooves 11 and the second crown grooves 12 have substantially the same configuration except for the points described above.

Each of the crown grooves 10 has a length (L2) in the tire axial direction from 40% to 70% of the tread development half width (TWh) (shown in FIG. 2 and the same applies hereinafter). Each of the crown grooves 10 has a length (L3) in the tire circumferential direction smaller than the length (L2) in the tire axial direction of each of the crown grooves 10, for example. Specifically, the length (L3) is from 60% to 75% of the length (L2).

Each of the crown grooves 10 includes the first oblique groove portion 13 arranged on the first tread edge (T1) side and the second oblique groove portion 14 arranged on the second tread edge (T2) side. The first oblique groove portion 13 and the second oblique groove portion 14 are inclined in opposite sides with respect to the tire axial direction. In the present embodiment, the second oblique groove portions 14 of the first crown grooves 11 are located on the tire equator (C) and the first oblique groove portions 13 of the second crown grooves 12 are located on the tire equator (C).

The crown grooves 10 in the present embodiment are bent so as to be convex to a heel side (leading side) in the rotational direction (R) (hereinafter may be simply referred to as "heel side"). Thereby, each of the crown grooves 10 includes a vertex (10t) on the heel side in the rotational direction (R). A distance (L4) in the tire axial direction from the tire equator (C) to the vertex (10t) is from 5% to 20% of the length (L2) in the tire axial direction (L2) of each of the crown grooves 10, for example. As a result, a large ground pressure is likely to act on the crown grooves 10, therefore, the off-road performance is further improved.

An angle θ2 of each of the crown grooves 10 (i.e., the angle θ2 of each of the first oblique groove portions 13 and the second oblique groove portions 14) with respect to the tire circumferential direction is from 40 to 60 degrees, preferably from 45 to 55 degrees, for example. Further, an angle θ3 between the first oblique groove portion 13 and the second oblique groove portion 14 of each of the crown grooves 10 is set to from 90 to 110 degrees. The crown grooves 10 configured as such can maintain the off-road straight running stability while suppressing uneven wear of the groove edges. In addition, when the crown grooves 10 include zigzag groove edges, in such a crown groove 10, the angle θ2 corresponds to an angle with respect to the tire circumferential direction of an imaginary linear line (13v) connecting both ends of the first oblique groove portion 13 or an imaginary linear line (14v) connecting both ends of the second oblique groove portion 14. Similarly, the angle θ3 corresponds to an angle between the imaginary linear line (13v) and the imaginary linear line (14v).

Each of the first oblique groove portions 13 includes a heel-side groove edge (13a) and a toe-side groove edge (13b). The heel-side groove edge (13a) is arranged on the heel side in the rotational direction (R) with respect to a groove centerline of the first oblique groove portion 13. The toe-side groove edge (13b) is arranged on a toe side (trailing side) in the rotational direction (R) (hereinafter may simply be referred to as "toe side") with respect to the groove centerline. The heel-side groove edge (13a) includes a straight edge 15 and a zigzag edge 16, for example. The straight edge 15 extends straight on the tire equator (C) side. The zigzag edge 16 extends in a zigzag shape on the first tread edge (T1) side of the straight edge 15. More specifically, the zigzag edge 16 alternately includes a portion extending at an angle similar to that of the straight edge 15 and a portion extending at a smaller angle with respect to the tire circumferential direction. The crown grooves 10 having the first oblique groove portions 13 configured as such help to improve the off-road straight running stability and the uneven wear resistance performance in a good balance.

In a preferred embodiment, the straight edge 15 crosses the tire equator (C) when the first oblique groove portion 13 is arranged on the tire equator (C). Therefore, the uneven wear resistance performance is further improved.

The toe-side groove edge (13b) of the first oblique groove portion 13 extends linearly, for example. Thereby, the toe-side groove edge (13b) can provide a large grip in the tire circumferential direction when running off-road. However, the present disclosure is not limited to such an aspect.

The first oblique groove portion 13 has a groove width decreasing from the tire equator (C) side to the first tread edge (T1) side. It should be noted that the groove width corresponds to the distance between two groove edges formed on the ground contact surface (2s), and the same applies to the area where the chamfered portion 55 is formed. In a preferred embodiment, the groove width of the first oblique groove portion 13 decreases stepwise toward the first tread edge (T1). The first oblique groove portions 13 configured as such can easily discharge mud entered in the groove portions during off-road running, and can maintain excellent straight running stability.

The second oblique groove portion 14 has substantially the same configuration as the first oblique groove portion 13. Therefore, the configuration of the first oblique groove portion 13 described above can be applied to the second oblique groove portion 14.

Each of the crown grooves 10 include a first crown groove wall (10A) on the heel side in the rotational direction (R) and a second crown groove wall (10B) on the toe side in the rotational direction (R). It is preferred that the chamfered portion 55 is formed on at least a portion of the first groove wall 10A. The chamfered portions 55 in the present embodiment are continuous to the straight edges 15 of the first oblique groove portion 13 and the second oblique groove portion 14, for example. As a result, uneven wear around the crown grooves 10 can be reliably suppressed.

On the other hand, it is preferred that the zigzag edge 16 of the heel-side groove edge (13a) is configured as the non-chamfered portion 56. As a result, a high edge effect can be expected at the zigzag edge 16, and the off-road straight running stability can be further improved.

The second crown groove wall (10B) includes two oblique portions 26 inclined to opposite sides with respect to the tire axial direction, and a corner portion 27 between the two oblique portions 26. In the present embodiment, the corner portion 27 is formed with the chamfered portion 55. On the other hand, the chamfered portion 55 is not formed on the second crown groove wall (10B) except for the corner portion 27, and is configured as the non-chamfered portion 56. As a result, the off-road performance can be improved while suppressing the uneven wear around the corner portion.

Figure 5:
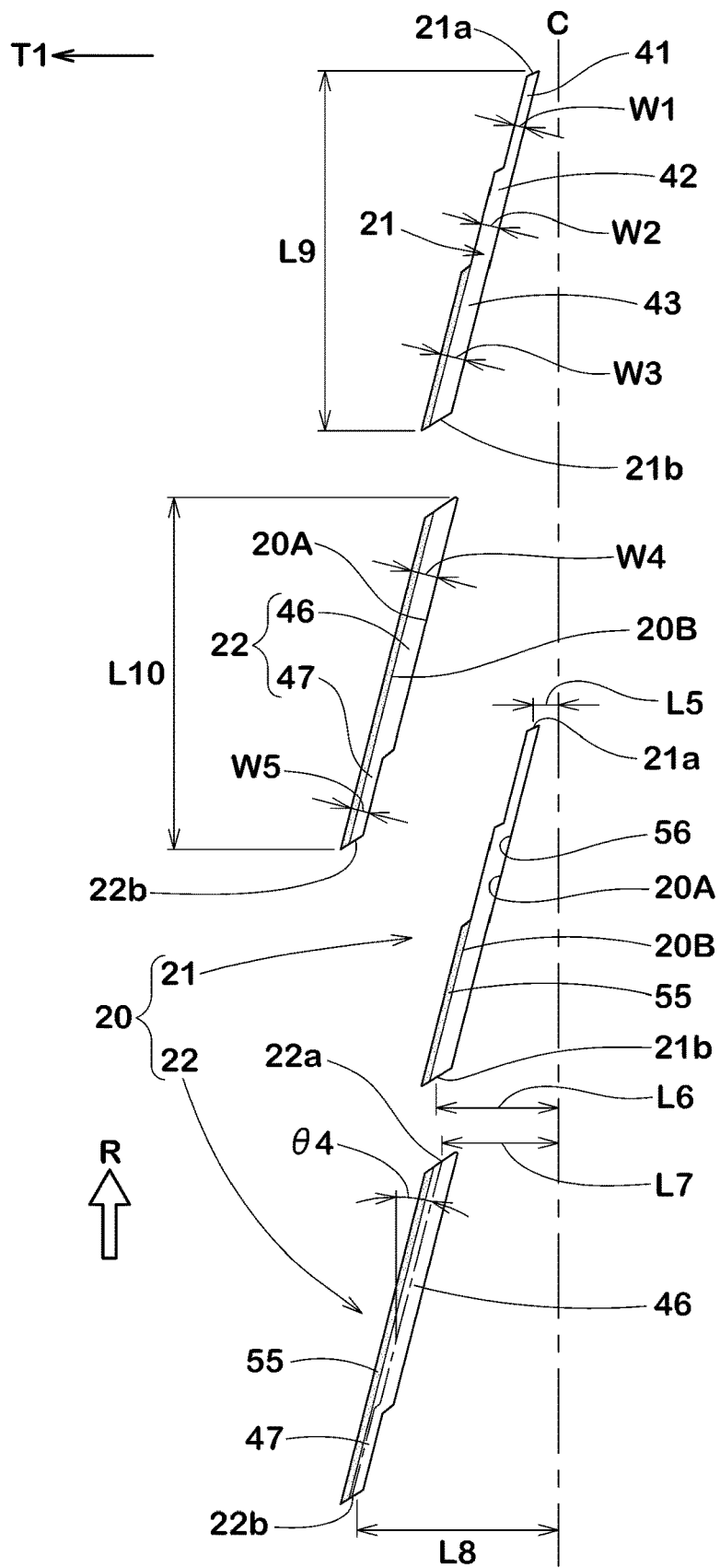
FIG. 5 is an enlarged view of middle grooves.

FIG. 5 is an enlarged view of the middle grooves 20. It should be noted that the crown grooves 10 and the shoulder grooves 30 are omitted in FIG. 5. As shown in FIG. 5, each of the middle grooves 20 is inclined to the first tread edge (T1) side as it goes from one end to the other end in the tire circumferential direction (the upper end to the lower end in FIG. 5). The middle grooves 20 of the present embodiment are inclined toward the first tread edge (T1) from the heel side to the toe side in the rotational direction (R), for example. Therefore, the middle grooves 20 are inclined to the same side as the first oblique groove portions 13 (shown in FIG. 3) of the crown grooves 10.

The middle grooves 20 are inclined at a relatively small angle with respect to the tire circumferential direction. The maximum angle θ4 of each of the middle grooves 20 with respect to the tire circumferential direction is, for example, from 5 to 25 degrees, preferably from 10 to 20 degrees. The middle grooves 20 configured as such moderately relaxes the rigidity in the tire axial direction of the tread portion 2 and helps improve the handling performance (especially steering lightness when tilting). It should be noted that the angle θ4 is measured by using the center line of each of the middle grooves 20. However, if the groove width changes suddenly and the groove center line includes a portion bent in a crank shape, the angle θ4 is measured excluding that portion. The same applies to other grooves below.

The middle grooves 20 include first middle grooves 21 and second middle grooves 22 aligned in the tire circumferential direction. The tread portion 2 of the present embodiment has a plurality of groove pairs each having the first middle groove 21 and the second middle groove 22 are arranged in the tire circumferential direction. In other words, the first middle grooves 21 and the second middle grooves 22 are alternately arranged one by one in the tire circumferential direction in the present embodiment. FIG. 5 shows two of the groove pairs. Further, the first middle grooves 21 are arranged on the heel side in the rotational direction (R) and on the tire equator (C) side relative to the second middle grooves 22.

Of each pair of the grooves, an end (21a) on the heel side in the rotational direction (R) of the first middle groove 21 is arranged closest to the tire equator (C). Further, the shortest distance (L5) in the tire axial direction from the tire equator (C) to the middle grooves 20 is from 3% to 18% of the tread development half width (TWh). Such an arrangement of the middle grooves 20 helps to improve the on-road handling performance. It should be noted that the shortest distance L5 is measured at the edge of the center line of the middle groove 20.

As shown in FIG. 2, in a preferred embodiment, the heel side end (21a) is located on the toe side in the rotational direction (R) of each of the first middle grooves 21. In a more preferred embodiment, in each pair of the first crown groove 11 and the first middle groove 21 immediately adjacent to each other in the tire axial direction, the distance in the tire axial direction between the vertex (10t) of the first crown groove 11 and the end (21a) on the heel side of the first middle groove 21 is 10% or less of the tread development half width (TWh). Thereby, the handling performance can be further improved.

Each of the first middle grooves 21 is inclined toward the first tread edge (T1) as it goes from the end (21a) to the toe side in the rotational direction (R). Therefore, in each pair of the first middle groove 21 and the second crown groove 12 immediately adjacent to each other in the tire axial direction, it is preferred that a region (21A), which is a portion located most toe side when the first middle groove 21 is divided into three equal parts in its longitudinal direction, overlaps the imaginary region obtained by extending the second crown groove 12 parallel to the tire axial direction. As a result, during off-road running, the first middle grooves 21 can supplement the grip force in the tire axial direction, thereby, the off-road straight running stability can be improved.

As shown in FIG. 5, a distance (L6) in the tire axial direction from the tire equator (C) to an end (21b) on the toe side of each of the first middle grooves 21 is from 30% to 40% of the tread development half width (TWh).

In each pair of the first middle groove 21 and the second middle groove 22 immediately adjacent to each other, it is preferred that the end on the heel side of the second middle groove 22 overlaps the virtual area obtained by the end of the toe side of the first middle groove 21 being extended parallel to the tire circumferential direction. A distance (L7) in the tire axial direction from the tire equator (C) to an end (22a) on the heel side of the second middle groove 22 is from 30% to 40% of the tread development half width (TWh). Thereby, the change in response when leaning over becomes linear, therefore, the on-road handling performance is improved.

Each of the second middle grooves 22 is inclined to the first tread edge (T1) side from the end (22a) toward the toe side in the rotational direction (R). Therefore, as shown in FIG. 2, it is preferred that a region (22A), which is a portion located in the middle when the second middle groove 22 is divided into three equal parts in its longitudinal direction, overlaps a virtual region obtained by the first crown groove 11 being extended parallel to the tire axial direction. Such a groove arrangement further improves the handling performance.

As shown in FIG. 5, a distance (L8) in the tire axial direction from the tire equator (C) to an end (22b) on the toe side of each of the second middle grooves 22 is from 50% to 70% of the tread development half width (TWh). In each pair of the second middle groove 22 and the first middle groove 21 adjacent thereto on the toe side, it is preferred that the toe side end (22b) of the second middle groove 22 is positioned on the toe side of the heel side end (21a) of the first middle groove 21. Therefore, it is possible that the middle grooves 20 work together to provide grip force in the tire axial direction.

A length (L9) in the tire circumferential direction of each of the first middle grooves 21 and a length (L10) in the tire circumferential direction of each of the second middle grooves 22 are each from 80% to 120% of the tread development half width (TWh), for example. Further, the length L9 of each of the first middle grooves 21 is from 90% to 120% of the length L10 of each of the second middle grooves 22. Together with the V-shaped crown grooves 10, the first middle grooves 21 and the second middle grooves 22 configured as such can improve the off-road performance and the on-road performance in a good balance.

Each of the first middle grooves 21 has the groove width increasing toward the toe side, for example. The groove width of each of the first middle grooves 21 in the present embodiment increases stepwise toward the toe side. Thus, each of the first middle grooves 21 includes a first groove portion 41, a second groove portion 42, and a third groove portion 43 having different groove widths. The first groove portion 41 has a constant groove width (W1) in its longitudinal direction. The second groove portion 42 has a constant groove width (W2) in its longitudinal direction. The third groove portion 43 has a constant groove width (W3) in its longitudinal direction.

The first groove portion 41 is located furthest on the heel side and includes the heel side end (21a) of the first middle grooves 21. The second groove portion 42 continues to the first groove portion 41 on the toe side. The groove width (W2) of the second groove portion 42 is greater than the groove width (W1) of the first groove portion 41. Specifically, the groove width (W2) of the second groove portion 42 is from 1.50 to 2.50 times the groove width (W1) of the first groove portion 41. In a further preferred embodiment, the maximum depth of the second groove portion 42 is greater than the maximum depth of the first groove portion 41. The first groove portion 41 and the second groove portion 42 configured as such help to improve drainage performance of the first middle grooves 21 while maintaining the uneven wear resistance performance.

The third groove portion 43 continues to the second groove portion 42 on the toe side and includes the toe side end (21b) of the first middle groove 21. The groove width (W3) of the third groove portion 43 is greater than the groove width (W1) of the first groove portion 41 and greater than the groove width (W2) of the second groove portion 42. The groove width (W3) of the third groove portion 43 is from 2.0 to 3.0 times the groove width (W1) of the first groove portion 41. Further, a length of the third groove portion 43 in the tire circumferential direction is greater than a length of the first groove portion 41 in the tire circumferential direction and a length of the second groove portion 42 in the tire circumferential direction. In a preferred embodiment, the maximum depth of the third groove portion 43 is greater than the maximum depth of the first groove portion 41. In the present embodiment, the second groove portion 42 and the third groove portion 43 have the same depth. The third groove portion 43 configured as such helps improve wet performance.

Each of the second middle grooves 22 has a groove width decreasing toward the toe side, for example. The groove width of each of the second middle grooves 22 of the present embodiment decreases stepwise toward the toe side. Thus, each of the second middle grooves 22 includes a first groove portion 46 and a second groove portion 47 having different groove widths. The first groove portion 46 has a groove width (W4) constant in its longitudinal direction. The second groove portion 47 has a groove width (W5) constant in its longitudinal direction.

In each of the second middle grooves 22, the first groove portion 46 includes the heel side end (22a) of the second middle groove 22. The second groove portion 47 is connected to the first groove portion 46 on the toe side thereof in each of the second middle grooves 22. The groove width (W5) of the second groove portion 47 is smaller than the groove width (W4) of the first groove portion 46. Specifically, the groove width (W5) of the second groove portion 47 is from 50% to 70% of the groove width (W4) of the first groove portion 46. Further, a length of the second groove portion 47 (the so-called peripheral length along the length direction) is smaller than a length of the first groove portion 46. The length of second groove portion 47 is from 30% to 40% of the length of the first groove portion 46. In a more preferred embodiment, the maximum depth of the second groove portion 47 is smaller than the maximum depth of the first groove portion 46. The second middle grooves 22 including the first groove portions 46 and the second groove portions 47 configured as such help to improve the off-road performance and the uneven wear resistance performance in a good balance.

Each of the middle grooves 20 includes an inner groove wall (20A) on the tire equator (C) side and an outer groove wall (20B) on the first tread edge (T1) side. In the present embodiment, the chamfered portion 55 is formed in at least part of the outer groove wall (20B). On the other hand, the inner groove wall (20A) is configured entirely as the non-chamfered portion 56. The middle grooves 20 configured as such help improve the uneven wear resistance performance and the off-road performance in a good balance.

From the point of view of further enhance the above-described effects, it is preferred that each of the first middle grooves 21 has the chamfered portion 55 formed on the entire outer groove wall (20B) of the third groove portion 43, and the other regions are configured as the non-chamfered portion 56.

From a similar point of view, it is preferred that each of the second middle grooves 22 has the outer groove wall (20B) configured entirely as the chamfered portion 55.

Figure 6:
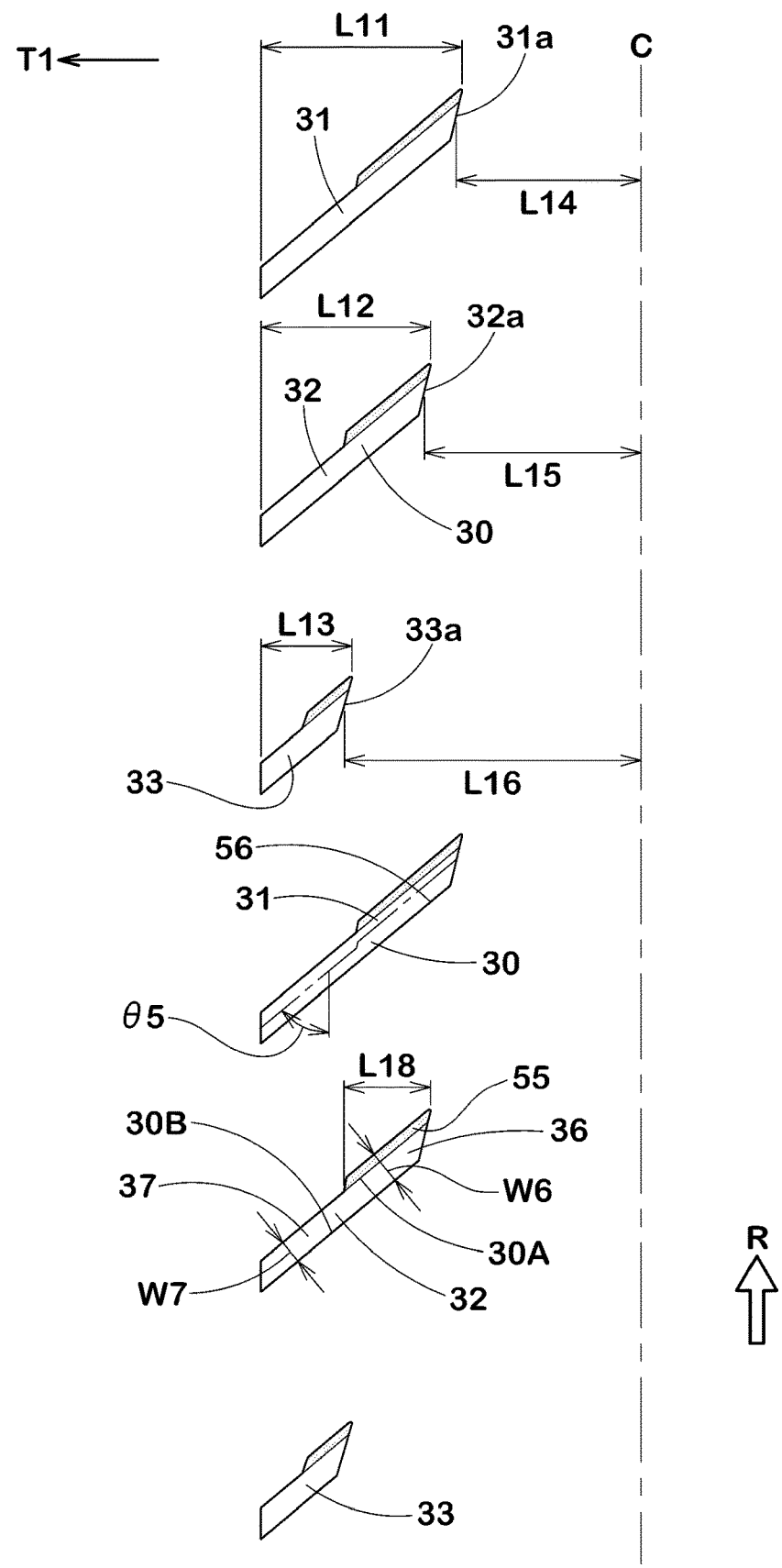
FIG. 6 is an enlarged view of shoulder grooves.

FIG. 6 is an enlarged view of a plurality of the shoulder grooves 30. In FIG. 6, the crown grooves 10 and the middle grooves 20 are omitted. As shown in FIG. 6, each of the shoulder grooves 30 is inclined toward the first tread edge (T1) as it goes from one end to the other end in the tire circumferential direction (the upper end to the lower end in FIG. 6). The shoulder grooves 30 in the present embodiment are inclined toward the first tread edge (T1) from the heel side to the toe side in the rotational direction (R), for example. Therefore, the shoulder grooves 30 are inclined in the same side as the middle grooves 20 (shown in FIG. 5) with respect to the tire circumferential direction. The shoulder grooves 30 configured as such help to improve the uneven wear resistance performance.

It is preferred that the maximum angle θ5 of each of the shoulder grooves 30 with respect to the tire circumferential direction is larger than the angle θ4 (shown in FIG. 5) of each of the middle grooves 20 with respect to the tire circumferential direction. Further, the angle θ5 of each of the shoulder grooves 30 approximates the angle θ2 (shown in FIG. 3) of each of the crown grooves 10 with respect to the tire circumferential direction, and it is preferred that the difference between these angles is 10 degrees or less. Specifically, the angle θ5 of each of the shoulder grooves 30 is, for example, from 35 to 55 degrees, preferably from 40 to 50 degrees. The shoulder grooves 30 configured as such make it easier to converge the tilting during cornering, therefore, the handling performance is improved.

The shoulder grooves 30 include first shoulder grooves 31, second shoulder grooves 32, and third shoulder grooves 33 aligned in the tire circumferential direction. In the tread portion 2 of the present embodiment, a plurality of groove groups each consisting of one of the first shoulder grooves 31, one of the second shoulder grooves 32, and one of the third shoulder grooves 33 are arranged in the tire circumferential direction, therefore, the first shoulder grooves 31, the second shoulder grooves 32, and the third shoulder grooves 33 are arranged one by one by one in the tire circumferential direction. FIG. 6 show two of the groove groups. In each of the groove groups, the first shoulder groove 31 is arranged on the most heel side in the rotational direction (R). Further, the third shoulder groove 33 is arranged on the most toe side in the most rotational direction (R). The second shoulder groove 32 is arranged between the first shoulder groove 31 and the third shoulder groove 33.

As shown in FIG. 2, each of the first shoulder grooves 31 is adjacent immediately to a respective one of the first middle grooves 21 on the first tread edge (T1) side. Specifically, each of the first shoulder grooves 31 overlaps with a virtual region obtained by the third groove portion 43 of a respective one of the first middle grooves 21 being extended parallel to the tire axial direction toward the first tread edge (T1). Thereby, the uneven wear resistance performance can be further improved.

From a similar point of view, each of the second shoulder grooves 32 and each of the third shoulder grooves 33 are adjacent immediately to a respective one of the second middle grooves 22 on the first tread edge (T1) side. Specifically, each of the second shoulder grooves 32 overlaps with a virtual region obtained by the first groove portion 46 of a respective one of the second middle grooves 22 being extended in parallel with the tire axial direction toward the first tread edge (T1). Each of the third shoulder grooves 33 overlaps a virtual region obtained by extending the second groove portion 47 of a respective one of the second middle grooves 22 parallel to the tire axial direction to the first tread edge (T1) side.

As shown in FIG. 6, the length in the tire axial direction of the shoulder grooves 30 included in each groove group decreases toward the toe side. That is, a length L11 in the tire axial direction of the first shoulder groove 31 is the largest in each of the groove group. A length L13 in the tire axial direction of the third shoulder groove 33 is the smallest in each groove group. A length L12 in the tire axial direction of the second shoulder groove 32 is smaller than the length L11 of the first shoulder groove 31 and larger than the length L13 of the third shoulder groove 33. The groove groups configured as such help to improve the uneven wear resistance performance and on-road performance in a good balance.

The length L11 in the tire axial direction of each of the first shoulder grooves 31 is from 40% to 60% of the tread development half width (TWh), for example. Further, a distance L14 in the tire axial direction from the tire equator (C) to an end (31a) on the tire equator (C) side of each of the first shoulder grooves 31 is from 40% to 60% of the tread development half width (TWh), for example. Therefore, the shortest distance in tire axial direction from tire equator (C) to each of the shoulder grooves 30 is from 40% to 60% of the tread development half width (TWh). The first shoulder grooves 31 configured as such improve the wet performance and the handling performance in a good balance.

From a similar point of view, the length L12 in the tire axial direction of each of the second shoulder grooves 32 is from 40% to 50% of the tread development half width (TWh), for example. Further, a distance L15 in the tire axial direction from the tire equator (C) to an end (32a) on the tire equator (C) side of each of the second shoulder grooves 32 is from 50% to 60% of the tread development half width (TWh), for example. Similarly, the length L13 in the tire axial direction of each of the third shoulder grooves 33 is from 20% to 30% of the tread development half width (TWh), for example. Further, a distance L16 in the tire axial direction from the tire equator (C) to an end (33a) on the tire equator (C) side of each of the third shoulder grooves 33 is from 70% to 80% of the tread development half width (TWh), for example.

As shown in FIG. 2, a distance L17 in the tire axial direction from the first tread edge (T1) to an end on the first tread edge (T1) side of each of the shoulder grooves 30 is, for example, 10% or less and preferably 5% or less of the tread development half width (TWh). Thereby, wandering performance is improved.

As shown in FIG. 6, each of the shoulder grooves 30 includes an inner groove portion 36 on the tire equator (C) side and an outer groove portion 37 on the first tread edge (T1) side. The inner groove portion 36 has a length L18 in the tire axial direction from 40% to 60% of the length in the tire axial direction of each of the shoulder grooves 30. Further, each of the inner groove portion 36 and the outer groove portion 37 has a constant groove width. The outer groove portion 37 has a groove width W7 smaller than a groove width W6 of the inner groove portion 36. The groove width W7 of the outer groove portion 37 is from 70% to 80% of the groove width W6 of the inner groove portion 36. Thereby, the stability during cornering at a large camber angle is improved.

Each of the shoulder grooves 30 includes a first shoulder groove wall (30A) on the heel side in the rotational direction (R) and a second shoulder groove wall (30B) on the toe side in the rotational direction (R). Each of the shoulder grooves 30 of the present embodiment has the chamfered portion 55 formed in at least part of the first shoulder groove wall (30A). In a preferred embodiment, the chamfered portion 55 is formed over the entire inner groove portion 36 of the first shoulder groove wall (30A). On the other hand, areas other than this are configured as the non-chamfered portion 56. The shoulder grooves 30 configured as such improve the on-road performance while maintaining the uneven wear resistance performance.

As shown in FIG. 2, the tread portion 2 has a land ratio from 80% to 90%, for example. Therefore, the on-road performance and the off-road performance are improved in a good balance. It should be noted that the "land ratio" is a ratio Sb/Sa of the actual total ground contacting area (Sb) to the total area (Sa) of the virtual ground contact surface obtained by filling all the grooves arranged on the ground contact surface (2s) of the tread portion 2.

Between the tire equator (C) and the second tread edge (T2), there are the middle grooves 20 and the shoulder grooves 30 similar to those arranged between the tire equator (C) and the first tread edge (T1). The middle grooves 20 and the shoulder grooves 30 between the tire equator (C) and the second tread edge (T2) also have the features described above.

The tire 1 of the present embodiment is for rear wheels, and the rotational direction (R) is upward in FIG. 2. On the other hand, the tread pattern shown in FIG. 2 may be used for front tires. In this case, it is preferred that the configuration of each groove 8 remains as in FIG. 2 and the designated rotational direction (R) is the opposite (downward) of the direction shown in FIG. 2. Thereby, the on-road wet performance is improved.

In the case of tires for the front wheels, a large load tends to act on each groove during braking. Therefore, in the case of tires for the front wheels, it is preferred that each of the crown grooves 10 includes a first groove wall on the heel side in the rotational direction (R) and a second groove wall on the toe side in the rotational direction (R) and the chamfered portion is formed on at least a portion of the second groove wall (reference signs and the like are omitted). Thereby, the uneven wear around the crown grooves 10 in the tire for the front wheel can be suppressed.

While detailed description has been made of the two-wheel vehicle tire according to an embodiment of the present disclosure, the present disclosure can be embodied in various forms without being limited to the illustrated embodiment.

EXAMPLES

Tires having the tread pattern shown in FIG. 2 were made by way of test as tires for rear wheels in Examples. Further, tires having the tread pattern shown in FIG. 2 with the designated rotational direction (R) opposite to that showed in FIG. 2 were made by way of test as tires for front wheels in the Examples.

Figure 7:
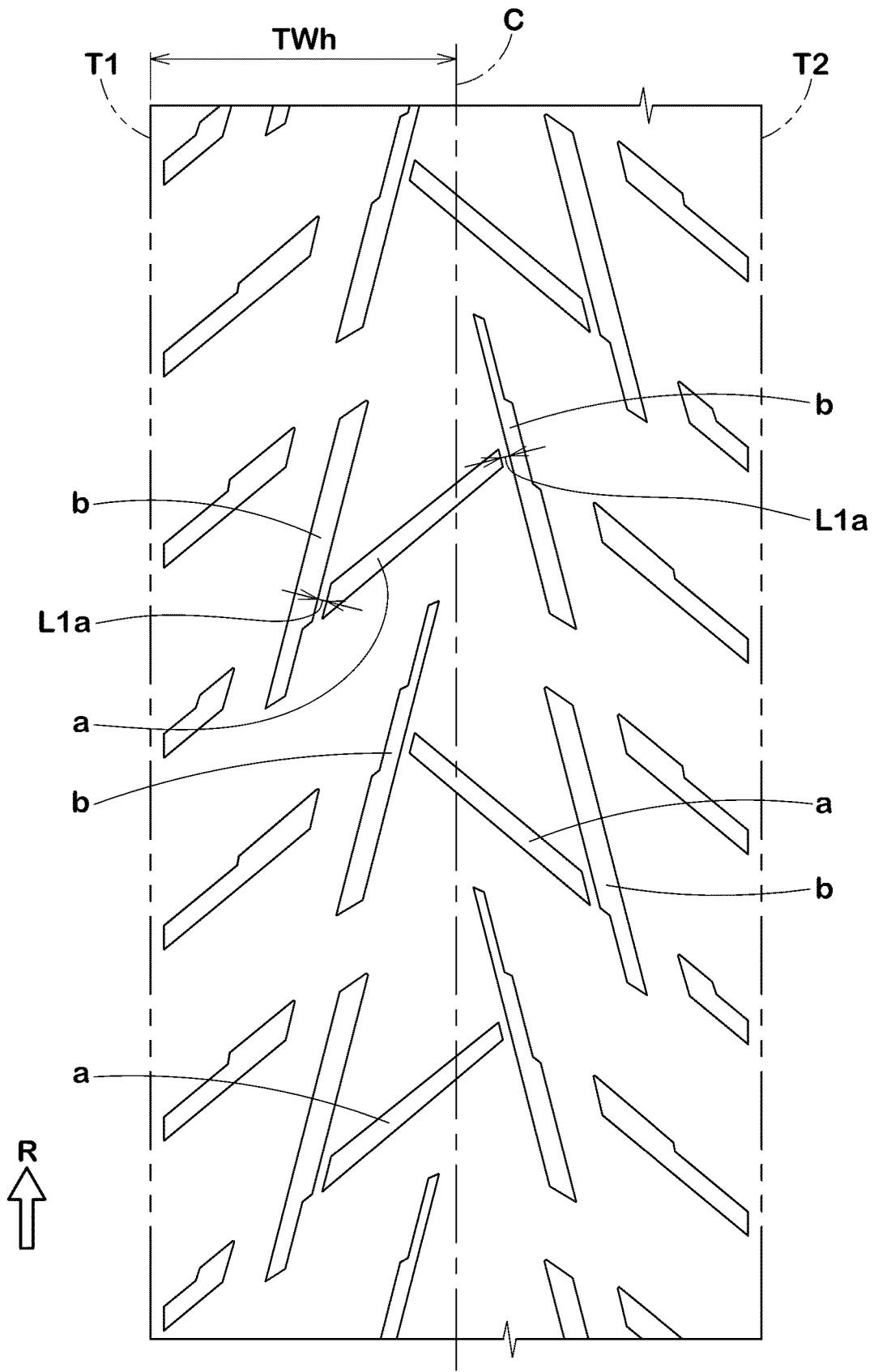
FIG. 7 is a development view of a tread portion of a two-wheel vehicle tire in Reference.

Tires having the tread pattern shown in FIG. 7 were made by way of test as tires for rear wheels in Reference. Further, tires having the tread pattern shown in FIG. 7 with the designated rotational direction (R) opposite to that showed in FIG. 7 were made by way of test as tires for front wheels in the Reference.

In the tread pattern of the tires in the Reference shown in FIG. 7, crown grooves (a) are not V-shaped, and the shortest distance (L1a) between each of the crown grooves (a) and a respective one of middle grooves (b) immediately adjacent thereto in the tire axial direction is about 2% of the tread development half width (TWh). Further, each groove is not chamfered. The tires in the Reference were substantially the same as the tires in the Examples except for the above items.

The tires for the rear wheels had a size of 150/70R17 and a tire inner pressure of 280 kPa, and were mounted on a tire rim of MT4.00. The tires for the front wheels had a size of 110/80R19 and a tire inner pressure of 225 kPa, and were mounted on a tire rim of MT2.50.

The test tires were each mounted on a dual-purpose vehicle with a displacement of 650 cc, and tested for the off-road straight running stability, the on-road handling performance, and the uneven wear resistance performance. The test methods were as follows.

<Off-Road Straight Running Stability>

The straight running stability during off-road running with the above test tires was evaluated by the driver's sensory perception. The results are indicated by an evaluation point based on the Reference being 100, wherein the larger the numerical value, the better the straight running stability is.

<On-Road Handling Performance>

The handling performance during on-road running with the above test vehicle was evaluated by the driver's sensory perception. The results are indicated by an evaluation point based on the Reference being 100, wherein the larger the numerical value, the better the handling performance is.

<Uneven Wear Resistance Performance>

The above test vehicle was driven on a paved road for 5000 km, and then the difference in the amount of wear was measured by comparing the grooves with the greatest amount of wear with the grooves with the least amount of wear regarding the tires for the rear wheels. The results were evaluated by using reciprocals of the difference in the amounts of wear and indicated by an index based on the Reference being 100, wherein the larger the numerical value, the smaller the difference in the amount of wear, which shows the better uneven wear resistance performance.

The test results are shown in Table 1.

TABLE 1

|  |  | Ref. | Ex. 1 | Ex. 2 | Ex. 3 | Ex. 4 | Ex. 5 | Ex. 6 | Ex. 7 |
| --- | --- | --- | --- | --- | --- | --- | --- | --- | --- |
| FIG. showing Tread pattern |  | FIG. 7 | FIG. 2 | FIG. 2 | FIG. 2 | FIG. 2 | FIG. 2 | FIG. 2 | FIG. 2 |
| Angle $\theta 2$ of Crown groove | [degree] | 45 | 45 | 40 | 60 | 45 | 45 | 45 | 45 |
| Angle $\theta 4$ of Middle groove | [degree] | 15 | 15 | 15 | 15 | 5 | 25 | 15 | 15 |
| Angle $\theta 5$ of Shoulder groove | [degree] | 45 | 45 | 45 | 45 | 45 | 45 | 35 | 55 |
| Off-road Straight running stability | [evaluation point] | 100 | 100 | 98 | 108 | 100 | 100 | 100 | 100 |
| On-road Handling performance | [evaluation point] | 100 | 115 | 115 | 103 | 110 | 110 | 103 | 110 |
| Uneven wear resistance performance | [index] | 100 | 110 | 110 | 103 | 110 | 107 | 110 | 110 |

The test results show that the tires in Examples 1 to 7 had the on-road handling performance of 103 to 115 points and the uneven wear resistance performance of 103 to 110 points while maintaining the off-road straight running stability of 98 to 108 points. In other words, it was confirmed that the tires in the Examples 1 to 7 improved the on-road handling performance and the uneven wear resistance performance while maintaining the off-road straight running stability.

Further, tires having varied angle $\theta 1$ of the sloping surface of the chamfered portion and varied land ratio were made by way of test, and each of the test tires was tested for the off-road straight running stability, the on-road handling performance, and the uneven wear resistance performance in the same manner.

The test results are shown in Table 2.

TABLE 2

|  |  | Ref. | Ex. 8 | Ex. 9 | Ex. 10 | Ex. 11 | Ex. 12 |
| --- | --- | --- | --- | --- | --- | --- | --- |
| FIG. showing Tread pattern |  | FIG. 7 | FIG. 2 | FIG. 2 | FIG. 2 | FIG. 2 | FIG. 2 |
| Angle $\theta 1$ of Sloping surface of Chamfered portion | [degree] | — | 50 | 40 | 60 | 50 | 50 |
| Land ratio of Tread portion | [%] | 85 | 85 | 85 | 85 | 80 | 90 |
| Off-road Straight running stability | [evaluation point] | 100 | 100 | 100 | 100 | 102 | 97 |
| On-road handling performance | [evaluation point] | 100 | 112 | 112 | 112 | 105 | 115 |
| Uneven wear resistance performance | [index] | 100 | 115 | 110 | 115 | 110 | 115 |

The test results show that the tires in Examples 8 to 12 had the on-road handling performance of 105 to 115 points and the uneven wear resistance performance of 110 to 115 points while maintaining the off-road straight running stability of 97 to 102 points. In other words, it was confirmed that the tires in the Examples 8 to 12 improved the on-road handling performance and the uneven wear resistance performance while maintaining the off-road straight running stability.

STATEMENT OF DISCLOSURE

The present disclosure includes the following aspects.

Present Disclosure 1

A two-wheel vehicle tire comprising a tread portion,
wherein the tread portion includes a first tread edge, a second tread edge, a ground contact surface demarcated between the first tread edge and the second tread edge, a plurality of grooves arranged on the ground contact surface, and a tread development half width,
wherein the tread development half width is a distance along the ground contact surface from a tire equator to the first tread edge,
the grooves include a plurality of crown grooves arranged on the tire equator, a plurality of middle grooves arranged on the first tread edge side of the crown grooves, and a plurality of shoulder grooves arranged on the first tread edge side of the middle grooves,
each of the crown grooves is bent in a V-shape so as to be convex to one side in a tire circumferential direction, and
each of the grooves has the shortest distance from 5% to 30% of the tread development half width between another one of the grooves immediately adjacent to the each of the grooves.

Present Disclosure 2

The two-wheel vehicle tire according to Present Disclosure 1, wherein the ground contact surface of the tread portion is curved in an arc shape so as to be convex outward in a tire radial direction in a lateral cross section of the tread portion.

Present Disclosure 3

The two-wheel vehicle tire according to Present Disclosure 1, wherein the shortest distance in a tire axial direction from the tire equator to each of the middle grooves is from 3% to 18% of the tread development half width.

Present Disclosure 4

The two-wheel vehicle tire according to Present Disclosure 1, wherein the shortest distance in a tire axial direction from the tire equator to each of the shoulder grooves is from 40% to 60% of the tread development half width.

Present Disclosure 5

The two-wheel vehicle tire according to Present Disclosure 1, wherein each of the crown grooves has an angle from 40 to 60 degrees with respect to the tire circumferential direction.

Present Disclosure 6

The two-wheel vehicle tire according to Present Disclosure 1, wherein each of the middle grooves is inclined to the first tread edge side as it goes from an end thereof on the one side to an end thereof on the other side in the tire circumferential direction.

Present Disclosure 7

The two-wheel vehicle tire according to Present Disclosure 6, wherein each of the middle grooves has the maximum angle from 5 to 25 degrees with respect to the tire circumferential direction.

Present Disclosure 8

The two-wheel vehicle tire according to Present Disclosure 6, wherein the shoulder grooves are inclined to the same side as the middle grooves with respect to the tire circumferential direction.

Present Disclosure 9

The two-wheel vehicle tire according to Present Disclosure 8, wherein each of the shoulder grooves has the maximum angle from 35 to 55 degrees with respect to the tire circumferential direction.

Present Disclosure 10

The two-wheel vehicle tire according to Present Disclosure 1, wherein each of the grooves has a chamfered portion formed in at least a part thereof.

Present Disclosure 11

The two-wheel vehicle tire according to Present Disclosure 10, wherein
the two-wheel vehicle tire is for front wheels and has a designated rotational direction,
each of the crown grooves has a first crown groove wall on a heel side in the rotational direction and a second crown groove wall on a toe side in the rotational direction, and
at least a part of the second crown groove wall is formed with the chamfered portion.

Present Disclosure 12

The two-wheel vehicle tire according to Present Disclosure 10, wherein
the two-wheel vehicle tire is for rear wheels and has a designated rotational direction,
each of the crown grooves has a first crown groove wall on a heel side in the rotational direction and a second crown groove wall on a toe side in the rotational direction, and
at least a part of the first crown groove wall is formed with the chamfered portion.

Present Disclosure 13

The two-wheel vehicle tire according to Present Disclosure 10, wherein
the chamfered portion is composed of a sloping surface connected to the ground contact surface, and
the sloping surface has an angle from 40 to 60 degrees with respect to a tread normal.

Present Disclosure 14

The two-wheel vehicle tire according to Present Disclosure 10, wherein the two-wheel vehicle tire has a designated rotational direction, each of the crown grooves is bent so as to be convex to a heel side in the rotational direction and has a first crown groove wall on the heel side in the rotational direction and a second crown groove wall on a toe side in the rotational direction, the second crown groove wall includes two oblique portions inclined to opposite sides with respect to a tire axial direction, and a corner portion between the two oblique portions, and the corner portion is formed with the chamfered portion.

Present Disclosure 15

The two-wheel vehicle tire according to Present Disclosure 10, wherein each of the middle grooves includes an inner groove wall on the tire equator side and an outer groove wall on the first tread edge side, and at least a part of the outer groove wall is formed with the chamfered portion.

Present Disclosure 16

The two-wheel vehicle tire according to Present Disclosure 10, wherein the two-wheel vehicle tire has a designated rotational direction, each of the shoulder grooves includes a first shoulder groove wall on a heel side in the rotational direction and a second shoulder groove wall on a toe side in the rotational direction, and at least a part of the first shoulder groove wall is formed with the chamfered portion.

Present Disclosure 17

The two-wheel vehicle tire according to Present Disclosure 1, wherein each of the crown grooves includes a first oblique groove portion and a second oblique groove portion, the first oblique groove portion is inclined to one side with respect to a tire axial direction, the second oblique groove portion is connected with the first oblique groove portion on the second tread edge side and inclined to a side opposite to the first oblique groove portion with respect to the tire axial direction, the first oblique groove portion has a groove width decreasing toward the first tread edge, and the second oblique groove portion has a groove width decreasing toward the second tread edge.

Present Disclosure 18

The two-wheel vehicle tire according to Present Disclosure 1, wherein the two-wheel vehicle tire has a designated rotational direction, the middle grooves include first middle grooves inclined with respect to the tire circumferential direction, each of the first middle grooves is inclined to the first tread edge side as it goes from an end on a heel side to an end on a toe side in the rotational direction, and each of the first middle grooves has a groove width increasing to the toe side in the rotational direction.

Present Disclosure 19

The two-wheel vehicle tire according to Present Disclosure 18, wherein the middle grooves include second middle grooves inclined with respect to the tire circumferential direction, each of the second middle grooves is inclined to the first tread edge side as it goes from an end on a heel side to an end on a toe side in the rotational direction, and each of the second middle grooves has a groove width decreasing to the toe side in the rotational direction.

Present Disclosure 20

The two-wheel vehicle tire according to Present Disclosure 1, wherein each of the shoulder grooves includes an inner groove portion on the tire equator side and an outer groove portion on the first tread edge side, and the outer groove portion has a groove width smaller than a groove width of the inner groove portion.

DESCRIPTION OF REFERENCE SIGNS

2 tread portion
2s ground contact surface
8 groove
10 crown groove
20 middle groove
30 shoulder groove
T1 first tread edge
T2 second tread edge
TWh tread development half width

The invention claimed is:

1. A two-wheel vehicle tire comprising a tread portion, wherein the tread portion includes a first tread edge, a second tread edge, a ground contact surface demarcated between the first tread edge and the second tread edge, a plurality of grooves arranged on the ground contact surface, and a tread development half width, wherein the tread development half width is a distance along the ground contact surface from a tire equator to the first tread edge, the grooves include a plurality of crown grooves arranged on the tire equator, a plurality of middle grooves arranged on the first tread edge side of the crown grooves, and a plurality of shoulder grooves arranged on the first tread edge side of the middle grooves, each of the crown grooves is bent in a V-shape so as to be convex to one side in a tire circumferential direction, a shortest distance between immediately adjacent grooves is from 5% to 30% of the tread development half width, each of the crown grooves includes a first crown groove wall on the one side and a second crown groove wall on the other side in the tire circumferential direction, in each of the crown grooves, each of the first crown groove wall and the second crown groove wall has a chamfered portion in a center portion thereof in a tire axial direction and does not have the chamfered portion in a portion other than the center portion, and the center portion includes a bent portion of the V-shape in each of the crown grooves.

2. The two-wheel vehicle tire according to claim 1, wherein each of the crown grooves has a length in the tire circumferential direction in a range from 60% to 75% of a length thereof in the tire axial direction.

3. The two-wheel vehicle tire according to claim 1, wherein the shortest distance in the tire axial direction from the tire equator to each of the middle grooves is from 3% to 18% of the tread development half width.

4. The two-wheel vehicle tire according to claim 1, wherein the shortest distance in the tire axial direction from the tire equator to each of the shoulder grooves is from 40% to 60% of the tread development half width.

5. The two-wheel vehicle tire according to claim 1, wherein each of the crown grooves has an angle from 40 to 60 degrees with respect to the tire circumferential direction.

6. The two-wheel vehicle tire according to claim 1, wherein each of the shoulder grooves has the maximum angle from 35 to 55 degrees with respect to the tire circumferential direction.

7. The two-wheel vehicle tire according to claim 1, wherein
each of the crown grooves includes a first oblique groove portion and a second oblique groove portion,
the first oblique groove portion is inclined to one side with respect to the tire axial direction,
the second oblique groove portion is connected with the first oblique groove portion on the second tread edge side and inclined to a side opposite to the first oblique groove portion with respect to the tire axial direction,
the first oblique groove portion has a groove width decreasing toward the first tread edge, and
the second oblique groove portion has a groove width decreasing toward the second tread edge.

8. The two-wheel vehicle tire according to claim 1, wherein
each of the shoulder grooves includes an inner groove portion on the tire equator side and an outer groove portion on the first tread edge side, and
the outer groove portion has a groove width smaller than a groove width of the inner groove portion.

9. The two-wheel vehicle tire comprising a tread portion according to claim 1,
wherein each of the crown grooves has a vertex of the V-shape on the one side in the tire circumferential direction, and
a distance in the tire axial direction from the tire equator to the vertex is in a range from 5% to 20% of a length in the tire axial direction of each of the crown grooves.

10. The two-wheel vehicle tire according to claim 1, wherein each of the middle grooves is inclined to the first tread edge side as it goes from an end thereof on the one side to an end thereof on the other side in the tire circumferential direction.

11. The two-wheel vehicle tire according to claim 10, wherein each of the middle grooves has the maximum angle from 5 to 25 degrees with respect to the tire circumferential direction.

12. The two-wheel vehicle tire according to claim 1, wherein
the two-wheel vehicle tire has a designated rotational direction,
the middle grooves include first middle grooves inclined with respect to the tire circumferential direction,
each of the first middle grooves is inclined to the first tread edge side as it goes from an end on a heel side to an end on a toe side in the rotational direction, and
each of the first middle grooves has a groove width increasing to the toe side in the rotational direction.

13. The two-wheel vehicle tire according to claim 12, wherein
the middle grooves include second middle grooves inclined with respect to the tire circumferential direction,
each of the second middle grooves is inclined to the first tread edge side as it goes from an end on a heel side to an end on a toe side in the rotational direction, and
each of the second middle grooves has a groove width decreasing to the toe side in the rotational direction.

14. The two-wheel vehicle tire according to claim 1, wherein each of the grooves has a chamfered portion formed in at least a part thereof.

15. The two-wheel vehicle tire according to claim 14, wherein
the two-wheel vehicle tire is for front wheels and has a designated rotational direction,
each of the crown grooves has a first crown groove wall on a heel side in the rotational direction and a second crown groove wall on a toe side in the rotational direction, and
at least a part of the second crown groove wall is formed with the chamfered portion.

16. The two-wheel vehicle tire according to claim 14, wherein
the two-wheel vehicle tire is for rear wheels and has a designated rotational direction,
each of the crown grooves has a first crown groove wall on a heel side in the rotational direction and a second crown groove wall on a toe side in the rotational direction, and
at least a part of the first crown groove wall is formed with the chamfered portion.

17. The two-wheel vehicle tire according to claim 14, wherein
the chamfered portion is composed of a sloping surface connected to the ground contact surface, and
the sloping surface has an angle from 40 to 60 degrees with respect to a tread normal.

18. The two-wheel vehicle tire according to claim 14, wherein
the two-wheel vehicle tire has a designated rotational direction,
each of the crown grooves is bent so as to be convex to a heel side in the rotational direction and has a first crown groove wall on the heel side in the rotational direction and a second crown groove wall on a toe side in the rotational direction,
the second crown groove wall includes two oblique portions inclined to opposite sides with respect to the tire axial direction, and a corner portion between the two oblique portions, and
the corner portion is formed with the chamfered portion.

19. The two-wheel vehicle tire according to claim 14, wherein
each of the middle grooves includes an inner groove wall on the tire equator side and an outer groove wall on the first tread edge side, and
at least a part of the outer groove wall is formed with the chamfered portion.

20. The two-wheel vehicle tire according to claim 14, wherein
the two-wheel vehicle tire has a designated rotational direction, each of the shoulder grooves includes a first shoulder groove wall on a heel side in the rotational direction and a second shoulder groove wall on a toe side in the rotational direction, and at least a part of the first shoulder groove wall is formed with the chamfered portion.

* * * * *